United States Patent
Tufail et al.

(10) Patent No.: US 11,525,389 B2
(45) Date of Patent: Dec. 13, 2022

(54) ENGINE ASSEMBLY AND METHOD

(71) Applicant: Ford Global Technologies, LLC, Dearborn, MI (US)

(72) Inventors: Khizer Tufail, London (GB); Paul Nigel Turner, Chelmsford (GB); Roland Paul Stark, Hitchin (GB)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/319,321

(22) Filed: May 13, 2021

(65) Prior Publication Data
US 2021/0355862 A1 Nov. 18, 2021

(51) Int. Cl.
*F02B 37/18* (2006.01)
*F01N 3/20* (2006.01)
(Continued)

(52) U.S. Cl.
CPC ............ *F02B 37/18* (2013.01); *F01N 3/2006* (2013.01); *F01N 3/2013* (2013.01); *F01N 3/2026* (2013.01); *F01N 3/22* (2013.01); *F01N 3/323* (2013.01); *F02B 37/10* (2013.01); *F02B 37/168* (2013.01); *F02D 41/0007* (2013.01); *F02D 41/062* (2013.01); *F01N 2240/16* (2013.01);
(Continued)

(58) Field of Classification Search
CPC ........ F02B 37/18; F02B 37/10; F02B 37/168; F01N 3/2006; F01N 3/2013; F01N 3/2026; F01N 3/22; F01N 3/323; F01N 2240/16; F01N 2270/10; F01N 2590/11; F01N 2900/104; F01N 2900/1602; F02D 41/0007; F02D 41/062; F02D 13/0203
See application file for complete search history.

(56) References Cited

U.S. PATENT DOCUMENTS 5,785,137 A 7/1998 Reuyl
10,989,084 B2 * 4/2021 Laube ................... F01N 3/10
(Continued)

FOREIGN PATENT DOCUMENTS

DE 202015106063 U1 1/2016
DE 202015106063 U1 * 2/2016 ............... B60K 6/20
(Continued)

OTHER PUBLICATIONS

GB Search Report dated Sep. 14, 2020 of GB Application 2007053.8.
(Continued)

*Primary Examiner* — Audrey B. Walter
(74) *Attorney, Agent, or Firm* — Haley Guiliano LLP

(57) ABSTRACT

An engine assembly and a method of control thereof is provided. The engine assembly comprises: an exhaust gas aftertreatment device having an inlet for receiving exhaust gases leaving an engine; a heater for selectively heating gases at or upstream of the exhaust gas aftertreatment device; an air moving device for driving a flow of gases into the inlet of the exhaust gas aftertreatment device when the engine is in a non-running condition; and a controller configured to, prior to the engine being started: operate the heater to heat gases at or upstream of the inlet; and operate the air moving device to drive a flow of gases into the inlet to thereby heat the exhaust gas treatment device.

16 Claims, 5 Drawing Sheets

(51) Int. Cl.
  *F01N 3/22* (2006.01)
  *F02D 41/00* (2006.01)
  *F01N 3/32* (2006.01)
  *F02B 37/10* (2006.01)
  *F02B 37/16* (2006.01)
  *F02D 41/06* (2006.01)
  *F02D 13/02* (2006.01)

(52) U.S. Cl.
  CPC ....... *F01N 2270/10* (2013.01); *F01N 2590/11* (2013.01); *F01N 2900/104* (2013.01); *F01N 2900/1602* (2013.01); *F02D 13/0203* (2013.01)

(56) References Cited

U.S. PATENT DOCUMENTS

| | | |
|---|---|---|
| 2015/0110678 A1 | 4/2015 | Stelzer |
| 2018/0291827 A1 | 10/2018 | Disaro' et al. |
| 2020/0102874 A1 | 4/2020 | Kurtz et al. |

FOREIGN PATENT DOCUMENTS

| | | |
|---|---|---|
| DE | 102018207208 A1 | 11/2019 |
| EP | 25788365 | 4/2013 |
| FR | 2778206 A1 | 11/1999 |
| GB | 2581774 | 9/2020 |
| GB | 2581775 | 9/2020 |

OTHER PUBLICATIONS

Examination Report dated Jan. 15, 2021 of GB Application 2007053.8.

* cited by examiner

ENGINE ASSEMBLY AND METHOD

BACKGROUND

The present disclosure relates to an engine assembly and is particularly, although not exclusively, concerned with an engine assembly which reduces polluting emissions during an initial portion of a drive cycle following a cold engine start.

SUMMARY

Modern vehicles, e.g. motor vehicles, typically comprises one or more exhaust gas aftertreatment devices for reducing the amounts and/or concentrations of one or more polluting substances within the exhaust gases being emitted from the vehicle.

The exhaust gas aftertreatment devices may comprise a catalyst for catalysing a reaction involving a polluting substance. The efficiency of the exhaust gas aftertreatment devices in reducing the concentration of the polluting substances may depend on the temperature of the catalyst. In particular, the ability of the exhaust gas aftertreatment devices to operate effectively may depend on whether the temperature of the catalyst is greater than or equal to a light-off temperature of the catalyst, at which the catalyst begins to catalyse the reaction.

During a cold engine start and an initial portion of a drive cycle following a cold engine start, one or more of the exhaust gas aftertreatment devices may be at temperatures below the light-off temperatures of their respective catalysts. Hence, the exhaust gas aftertreatment devices may not operate effectively to reduce the amounts and/or concentrations of polluting substances within the exhaust gases.

In some cases, the emissions produced during the initial portion of the drive cycle, before the exhaust gas aftertreatment devices have reached their desirable operating temperatures, represent a significant proportion of the emissions over the drive cycle.

It is desirable to reduce polluting emissions during initial portions of vehicle drive cycles.

According to an aspect of the present disclosure, there is provided an engine assembly, e.g. for a vehicle, such as a motor vehicle, e.g. a hybrid vehicle, such as a mild hybrid electric vehicle, the engine assembly comprising: an exhaust gas aftertreatment device having an inlet for receiving exhaust gases leaving an engine; a heater, e.g. at or upstream of an inlet of the exhaust gas treatment device, for selectively heating gases at or upstream of the exhaust gas aftertreatment device; an air moving device, e.g. an electrically operated air moving device, for driving a flow of gases into the inlet of the exhaust gas aftertreatment device when the engine is in a non-running condition; and a controller configured to, prior to the engine being started: operate the heater to heat gases at or upstream of the inlet; and operate the air moving device to drive a flow of gases into the inlet to thereby heat the exhaust gas treatment device.

The engine assembly may further comprise an exhaust gas duct for carrying exhaust gases from the engine to the inlet of the exhaust gas treatment device. The heater may be provided in the exhaust gas duct.

The engine assembly may comprise a further exhaust gas aftertreatment device arranged downstream of the exhaust gas treatment device. The engine assembly may be configured such that the air moving device drives the flow of gases through the exhaust gas aftertreatment device to reach the further exhaust gas treatment device.

The heater may be an electrically operated heater. The heater may be integrally formed with the exhaust gas aftertreatment device. The air moving device may comprise an electrically driven inlet compressor, such as an e-booster, e.g. for providing compressed air to an inlet manifold of the engine. The air moving device may be arranged between an air inlet for the engine and the engine, e.g. the inlet manifold of the engine.

The engine assembly may be configured such that the air moving device drives the flow of gases from an air inlet for the engine to the inlet of the exhaust gas treatment device. The engine assembly may further comprise an engine bypass duct for carrying inlet gases from the air moving device to the inlet of the exhaust treatment device bypassing the engine. The engine assembly may further comprise a valve for controlling the flow of inlet gases through the engine bypass duct. The controller may be configured to control one or more valves in order to permit a flow of air from the air inlet for the engine to the inlet of the exhaust treatment device when the engine is not running. For example, the controller may be configured to control an inlet valve and/or an exhaust valve of a cylinder of the engine in order to provide a gas flow path through the engine between the air moving device and the inlet of the exhaust gas treatment device.

The controller may be configured to determine when the engine of the engine assembly may be started. The controller may be configured to control the operation of the heater and/or the operation of the air moving device based, at least in part, on the determination of when the engine may be started. For example, the controller may be configured to control the operation of the heater and air moving device for a predetermined period of time before it is determined that the engine may be started. The controller may be configured to control the operation of the heater and air moving device when, e.g. at or from the time that, the determination that the engine assembly may be started is made.

The controller may be configured to determine when the engine may be started based on a door of a vehicle in which the engine assembly is provided being unlocked and/or opened.

The controller may be configured to determine when the engine may be started based on a proximity of a key for the vehicle, or another device providing access to the vehicle, to the vehicle.

The controller may be configured to determine when the engine may be started based on a predicted journey time of the vehicle. For example, based on a time of day, week, month and/or year at which journeys have previously been performed by the vehicle.

The controller may be configured to control the operation of the heater and air mover in order to maintain the temperature of the exhaust gas aftertreatment device between a predetermined upper temperature limit and a predetermined lower temperature limit.

According to another aspect of the present disclosure, there is provided a method for an engine assembly, the engine assembly comprising: an exhaust gas aftertreatment device having an inlet for receiving exhaust gases leaving an engine; a heater for selectively heating gases at or upstream of the exhaust gas treatment device; and an air moving device for driving a flow of gases into the inlet of the exhaust gas treatment device, wherein the method comprises, prior to the engine being started: operating the heater to heat gases at or upstream of the inlet; and operating the air moving device to drive a flow of gases into the inlet to thereby heat the exhaust gas treatment device.

The method may further comprise controlling one or more valves of the engine assembly, such as an engine bypass valve or an inlet and/or exhaust valve of the engine, to permit a flow of air from an inlet of the engine assembly to the inlet of the exhaust gas treatment device, e.g. when the engine is in a non-running condition.

The method may comprise determining when the engine of the engine assembly may be started. The method may further comprise controlling the operation of the heater and the operation of the air moving device based on the determination.

The method may comprise determining a state of charge of a battery of the vehicle. The operation of the heater and/or the operation of the air moving device may be controlled based on the determined state of charge of the battery. For example, the state of charge may be compared to a threshold state of charge. The heater and the air moving device may be operated if the state of charge is greater than the threshold state of charge. The heater and/or the air moving device may not be operated of the state of charge is less than or equal to the threshold state of charge.

The method may comprise controlling the operation of the heater and air mover in order to maintain the temperature of the exhaust gas aftertreatment device between a predetermined upper temperature limit and a predetermined lower temperature limit.

To avoid unnecessary duplication of effort and repetition of text in the specification, certain features are described in relation to only one or several aspects or embodiments of the invention. However, it is to be understood that, where it is technically possible, features described in relation to any aspect or embodiment of the invention may also be used with any other aspect or embodiment of the invention. In particular, features described in relation to the first aspect mention above may be combined with the features of the second aspect and vice versa.

BRIEF DESCRIPTION OF THE DRAWINGS

For a better understanding of the present invention, and to show more clearly how it may be carried into effect, reference will now be made, by way of example, to the accompanying drawings, in which.

DETAILED DESCRIPTION

The present disclosure relates to an engine assembly for a vehicle, such as a motor vehicle (e.g. car, van, truck, motorcycle etc.), an industrial or agricultural vehicle (e.g. tractor, forklift, bulldozer, excavator etc), a marine vessel, aircraft or any other type of vehicle.

Figure 1:
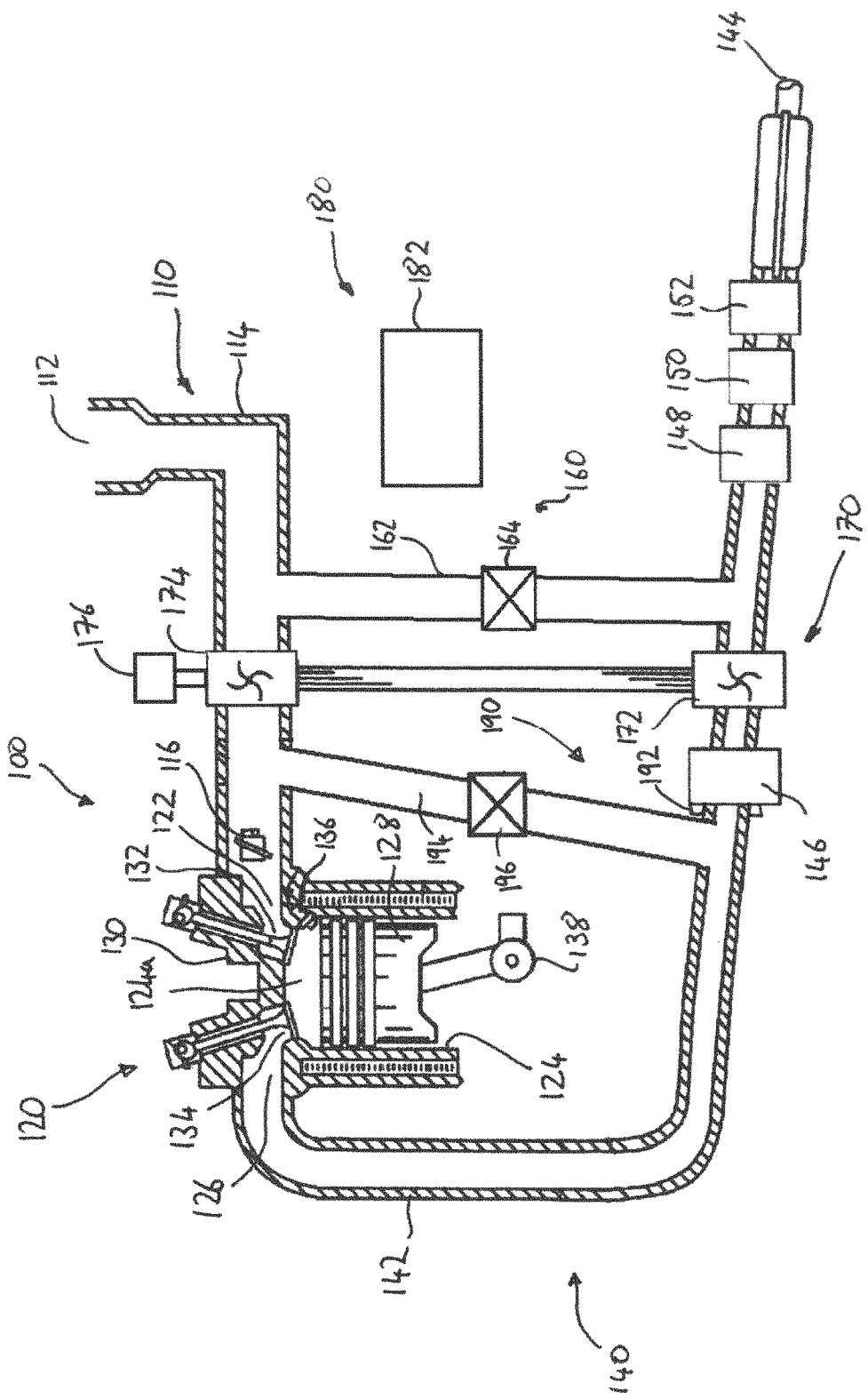
FIG. 1 is schematic view of an engine assembly according to arrangements of the present disclosure.

With reference to FIG. 1, a vehicle, such as a motor vehicle, may comprise an engine assembly 100 according to arrangements of the present disclosure. The engine assembly 100 comprises an intake system 110, an engine 120, an exhaust system 140 and a control system 180 comprising a controller 182 configured to control the operation of the engine assembly 100.

The engine assembly 100 comprises an engine 120 having an inlet manifold 122, a cylinder 124 and an exhaust manifold 126. A piston 128 is provided within the cylinder 124 and is configured to reciprocate within the cylinder 124 during a combustion cycle of the engine 120 whilst the engine is running. A combustion chamber 124a of the cylinder 124 is defined by one side of the piston 128, the walls of the cylinder 124 and a cylinder head 130.

The engine 120 further comprises one or more inlet valves 132 and one or more exhaust valves 134 to control the flow of inlet and exhaust gases into and out of the cylinder 124 respectively. The movements of the inlet and exhaust valves between their respective open and closed positions may be controlled by the controller 182.

During an intake stroke, the piston 128 moves within the cylinder 124 to increase the volume of the combustion chamber 124a, drawing inlet gases from the inlet manifold 122 into the cylinder via the inlet valves 132. Following the intake stroke, the inlet valve 132 is closed and the gases within the cylinder 124 are compressed as the piston 128 moves back towards the cylinder head 130, reducing the volume of the combustion chamber 124a.

Fuel is injected into the cylinder 124 via one or more fuel injectors 136 and the air and fuel mixture is ignited by virtue of the high pressure and temperature within the combustion chamber 124a. Combustion of the air and fuel mixture produces expanding combustion gases that act against the piston 128 to drive a crank shaft 138 of the engine 120.

Figure 2:
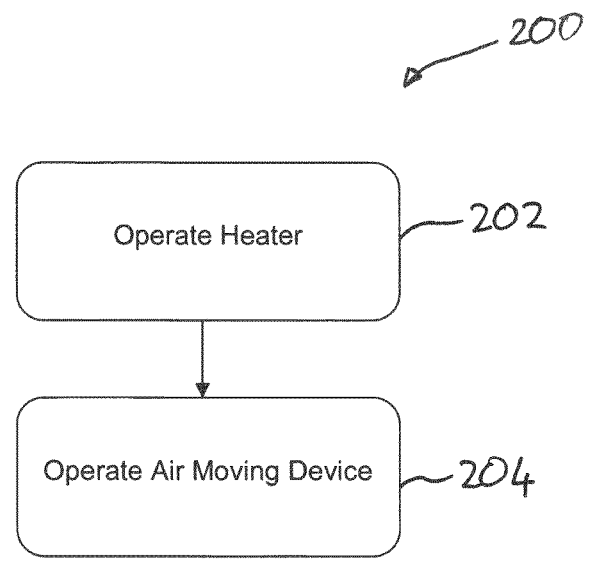
FIG. 2 is a flow chart illustrating a method for an engine assembly according to arrangements of the present disclosure.

In the arrangement depicted in FIG. 2, the engine 120 is a compression ignition engine. However, it is equally envisaged that the present disclosure may apply to any other type of engine, such as a spark ignition engine in which the fuel-air mixture within the cylinder 124 is ignited by a spark plug. Furthermore, although a single cylinder is shown in FIG. 2, the engine 120 may comprise any number of cylinders, such as 2, 3, 4, 6, 8 or more than 8 cylinders. In FIG. 2, the shape of components of the engine 120, such as the combustion chamber 124a, are schematic and presented for illustrative purposes only.

During an exhaust stroke of the piston 128, exhaust gases produced through the combustion within the cylinder are exhausted from the cylinder 124 into the exhaust manifold 126 via the exhaust valve 134.

An exhaust duct 142 of the exhaust system 140 is arranged to carry the exhaust gases from the exhaust manifold 126 to an exhaust outlet 144, e.g. of a vehicle exhaust tail-pipe, to be emitted from the vehicle.

The exhaust system 140 further comprises one or more exhaust gas after-treatment devices configured to reduce the concentrations of one or more pollutant substances within the exhaust gases. For example, in the arrangement depicted, the exhaust system 140 comprises a catalytic oxidation device 146, configured to oxidise soot and/or carbon monoxide, a $NO_X$ adsorber 148, configured to adsorb $NO_X$ from the exhaust gases, a particulate filter 150, configured to capture particular matter from the exhaust gases, and a catalytic reduction device 152 configured to remove $NO_X$ from the exhaust gases through a chemical reduction reaction in the presence of a catalyst.

In some arrangements, the exhaust system 140 may comprise other exhaust gas after-treatment devices in additional or as an alternative to those depicted in FIG. 1. Alternatively, one or more of the after-treatment devices shown in FIG. 1 may be omitted. In some arrangements, two or more after-treatment devices may be combined into a single device. For example, the exhaust system 140 may comprise a combined particulate filter and catalytic reduction device.

The performance of one or more of the exhaust gas aftertreatment devices may depend on the temperature of the exhaust gas aftertreatment device. In particular, the performance of one or more of the exhaust gas aftertreatment devices may be improved when the temperature of the exhaust gas after-treatment device, or a catalyst provided within the exhaust gas treatment device, is equal to or greater than a light-off temperature of the catalyst, e.g. a temperature at which the catalyst begins catalysing a reaction involving the polluting substance within the exhaust gas after-treatment device.

If a drive cycle of the vehicle in which the engine assembly 100 is provided begins when the engine assembly is cold, a significant proportion of the emissions, e.g. polluting emissions, emitted by the engine assembly 100 may be emitted whilst the engine assembly, and particularly the exhaust gas after-treatment devices, are warming up.

As depicted in FIG. 1, the engine assembly 100 may further comprise a turbocharger 170 including an exhaust driven turbine 172 arranged in the exhaust duct 142 and a compressor 174 arranged in the inlet duct 114. The turbine 172 and the compressor 174 may be coupled to the same shaft so that the compressor 174 can be driven by the turbine 172 to increase the pressure of inlet gases entering the inlet manifold 122.

In the arrangement shown in FIG. 1, the turbocharger 170 further comprises an electric motor 176 configured to drive rotation of the compressor 174, e.g. when insufficient power is available from the exhaust driven turbine 172. In such arrangements, the compressor 174 may be referred to as an e-booster. In some arrangements, when the electric motor 176 is operating to rotate the compressor 174, the compressor may be decoupled from the turbine 172. In other arrangements, the turbine 172 may be omitted. In other words, the compressor 174 may be driven exclusively by the electric motor 176.

The engine assembly 100 may further comprise an Exhaust Gas Recirculation (EGR) system 160. The EGR system 160 comprises an EGR duct 162 configured to recirculate a portion of the exhaust gases to the intake system 110 of the engine assembly 100, e.g. to the intake duct 114 or to the inlet manifold 122. The EGR system 160 further comprises an EGR valve 164 configured to control the flow of exhaust gases through the EGR duct 162.

In the arrangement shown in FIG. 1, the EGR system 160 is a low pressure EGR system configured to recirculate exhaust gases that have been expanded through the turbine to a position upstream of the compressor. In other arrangements, the engine assembly may comprise a high pressure EGR system configured to recirculate gases from a position between the exhaust manifold and the turbine 172 to a position between the inlet manifold 122 and the compressor 174.

Replacing a portion of the oxygen rich inlet air within the engine cylinder 124 with burnt exhaust gases reduces the volume of the combustion chamber 124a that is available for combustion. This reduces the peak temperature of combustion, thereby reducing the formation of $NO_X$.

By appropriately controlling the operation of the inlet throttle 116, turbocharger 170 and the EGR system 160, polluting emissions, such as $NO_X$ emissions, can be controlled without reducing the power provided by the engine 120. Additionally, controlling the operation of the turbocharger 170 and/or the EGR system 160 can be used to control the efficiency at which the engine 120 is operating.

The controller 182 may be configured to control the operation of the inlet throttle 116, the EGR valve 164 and/or the turbocharger turbine 172, in order to control the power being provided by the engine. The controller 182 may be an engine control unit or power train control unit.

The controller 182 may also be configured to control, e.g. directly control, the operation of the engine 120, e.g. by controlling the timing and quantity of fuel being introduced into the cylinder 124 by the injector 136 and/or the timing of the opening and closing of the inlet and exhaust valves 132, 134.

Additionally or alternatively, the controller 182, or another controller of the vehicle 2, may be configured to control the operation of the exhaust gas after-treatment devices, e.g. in order to effect the amount of polluting substances being emitted from the vehicle 2.

As described above, the efficiency of the exhaust gas aftertreatment devices may depend on the operating temperature of the exhaust gas aftertreatment devices. In order to improve the performance of the exhaust gas aftertreatment devices during the initial portion of a drive cycle, the engine assembly 100 further comprises an exhaust gas aftertreatment heating system 190. The system 190 comprises a heater 192, such as an electrically operated heater. As depicted, the heater 192 may be provided at or upstream of the inlet of one of the exhaust gas aftertreatment device, e.g. the first of the exhaust gas aftertreatment device to be reached by the exhaust gases leaving the engine. The heater 192 may be arranged downstream of the turbine 174 of the turbocharger 170, where present. For example, the heater 182 may be provided at or upstream of the inlet of the first of the exhaust treatment device to be reached by the exhaust gases leaving the turbine 174.

The heater 192 may be integrated into one of the exhaust gas treatment devices. For example, the heater 192 may be provided within a housing of one of the exhaust treatment devices. The heater 192 (or another heater) may be separate from the exhaust gas treatment device. For example, a heater may be provided in the exhaust duct 142 and may be coupled to a wall of the exhaust duct 142. Additionally or alternatively, a heater may be provided in the exhaust duct 142 immediately up steam of one of the exhaust gas treatment devices.

With reference to FIG. 2, the engine assembly 100 may be operated according to a method 200 in order to control the operation of the heater 192 to heat one, more than one or each of the exhaust gas aftertreatment devices. The controller 182 may control the operation of components and/or systems of the engine assembly to perform the blocks of the method 200 described below. The engine assembly 100 may be operated according to the method 200 when the engine is in a non-running condition, e.g. prior to the engine being started.

The method 200 comprises a first block 202, at which the heater 192 is operated to heat gases at or upstream of the inlet of the exhaust aftertreatment device or devices 146, 148, 150, 152 that are to be heated.

The method 200 further comprises a second block 204 at which an air moving device is operated to drive a flow of gases from the heater 192 to the inlet of the exhaust gas aftertreatment device to thereby heat the exhaust gas aftertreatment device. As shown in FIG. 1, the exhaust system 140 may comprise one or more further exhaust gas aftertreatment devices arranged downstream of the exhaust gas after treatment device. By operating the air moving device together with the heater, heated gases may flow through the exhaust gas aftertreatment device to reach the further exhaust gas aftertreatment devices. In this way, the further exhaust gas aftertreatment devices may be heated in addition to the exhaust gas aftertreatment device.

The air moving device may be arranged between the air inlet 112 and the inlet manifold 122 of the engine assembly. The air moving device may be the electrically driven compressor 174. Alternatively, the air moving device may be a dedicated air moving device provided in the engine assembly for driving a flow of gases through the heater 192 and exhaust gas aftertreatment device during execution of the method 200.

The engine assembly 100 may be configured such that operating the air moving device can cause a flow of gases from the air inlet 112 to the heater 192 during execution of the method 200, e.g. when the engine is in a non-running condition. In particular, the engine assembly 100 may be configured to provide an air flow path between the air inlet and the heater 192.

In some arrangements, the controller 182 may be configured to control the positions of the inlet and/or exhaust valves 132, 134 in order to permit the flow of gases from the air inlet to the heater 192 through one or more cylinders 124 of the engine 120.

As depicted in FIG. 1, the engine assembly 100 may comprise an engine bypass duct 194. As depicted, the engine bypass duct 194 may extend from the inlet duct 114 at a position downstream of the compressor 174, e.g. between the compressor 174 and the inlet manifold 122, to a position between the exhaust manifold 126 and the heater 192. The engine assembly 100 may further comprise an engine bypass valve 196 provided in the engine bypass duct 194 for controlling the flow of gases through the engine bypass duct.

Figure 3:
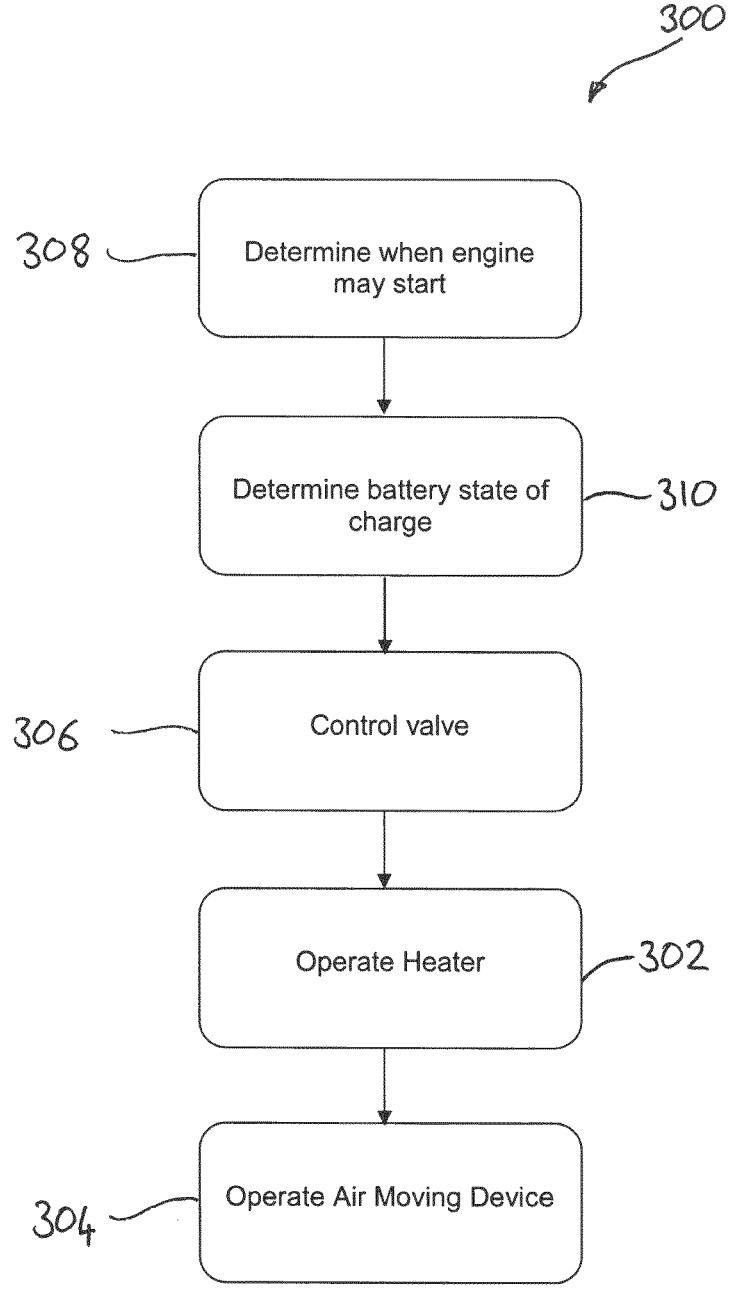
FIG. 3 is a flow chart illustrating another method for an engine assembly according to arrangements of the present disclosure.

FIG. 3 illustrates another method 300 of operating an engine assembly according to the present disclosure. The method 300 is similar to the method 200 and comprises first and second blocks 302, 304 which are similar to first and second blocks 202, 204 of the method 200 described above.

The method 300 may further comprise a valve control block 306, at which one or more valves of the engine assembly 100 are controlled in order to provide a gas flow path for air to flow from the air inlet 112 to the heater 192 under the action of the air moving device, e.g. the e-booster 174. For example, the inlet and exhaust valves 132, 134 of the engine 120 and/or the engine bypass valve 196 may be controlled at the valve control block 306 to provide the flow path.

As shown in FIG. 1, the EGR duct 162 may be coupled to the exhaust duct 142 at a position downstream of the heater 192 and upstream of one or more of the exhaust gas aftertreatment devices 148, 150, 152. It may therefore by desirable for the EGR valve 164 to be closed during performance of the method 300, in order to prevent the gases that have been heated by the heater from flowing though the EGR duct 162 rather than through the downstream exhaust gas aftertreatment devices. Further, there may be no need for exhaust gases to be recirculated whilst the engine is not running. The position of the EGR valve 164 may therefore be controlled at the valve control block 306, e.g. to close the EGR valve to restrict or substantially prevent recirculation of gases that have been heated by the heater 192.

When the engine 120 is started, the valves may no longer be controlled according to the method 300. In particular, the engine bypass valve 196 may be closed and the inlet and exhaust valves 132, 134, and the EGR valve 164 may be controlled using another method, e.g. a method for starting and/or running the engine 120.

It may be desirable for the heater 192 and air moving device, e.g. e-booster 174, to be operated according to the method 200, 300 for a period of time prior to the engine being started. In particular, it may be desirable for the heater 192 and the air moving device to be operate for a period of time prior to the engine being started that is sufficient for the exhaust gas aftertreatment device to reach desirable operating temperatures, such as light-off temperatures of catalysts within the exhaust gas aftertreatment devices.

The method 300 may comprise an engine start determination block 308, at which it is determined, e.g. predicted, when the engine may be started. The method 300, e.g. the other blocks of the method 300 described above, may be performed when it is determined that the engine may be started. For example, the blocks of the method 300 may be performed once a determination has been made that the engine may be started.

In some arrangements, the method 300 may comprise determining, at the engine start determination block 308, when the engine may be started and the other blocks of the method 300 may be performed at a first predetermine time prior to when the engine may be started.

In one arrangement, it may be determined that the engine may be started based on a proximity of a key for the vehicle, or another device for permitting access to the vehicles, to the vehicle. Additionally or alternatively, it may be determined that the engine may be started based on a door of the vehicle being unlocked and/or a key for the vehicle being inserted into the ignition. Additionally or alternatively again, it may be determined that the engine may be started when a door to a garage in which the vehicle is being kept is opened.

In some arrangements, it may be predicted that the engine may be started based on a time of day, week, moth or year and, optionally, one or more times at which the engine has previously been started and/or at which journeys have previously been performed by the vehicle in which the engine assembly 100 is installed. In other arrangements, a time at which the engine may be started may be determined based on an engine start time and/or vehicle journey time input by a user of the vehicle.

When one or more blocks of the method 300 are performed based on a predicted engine start time, the blocks of the method 300 may be performed for a second predetermined time. The second predetermined time may be the same as the first predetermined time or may be difference, e.g. longer or shorter. If the engine has not been started within the second predetermine time, the method 300 may end, e.g. the heater 192 and air moving device may no longer be operated.

In some arrangements, the exhaust system 140 may further comprise one or more temperature sensors arranged to measure the temperatures of one or more of the exhaust gas aftertreatment devices. In such arrangements, the method 300 may be performed until the exhaust gas aftertreatment device have reached one or more, e.g. respective, predetermined temperatures, or until the engine is started.

In some arrangements, the heater and air moving device may be operated, e.g. at the first and second blocks 302, 304 of the method 300, in order to maintain a temperature of one or more of the exhaust gas aftertreatment devices between a predetermined upper temperature limit and a predetermined lower temperature limit until the engine is started. The predetermined lower temperature limit may be the light-off temperature of the catalyst.

In some arrangements, the heater 192 may continue to be controlled according to the method 200, 300 after the engine has been started. For example, the heater 192 may continue to be operated until the second predetermine period of time has elapsed or until the exhaust gas aftertreatment devices have reached the one or more, e.g. respective, predetermined temperatures.

The heater 192 and air moving device, e.g. e-booster 174, may be powered by a battery of the engine assembly 100 or the vehicle in which the engine assembly is installed. It may be undesirable for the state of charge of the battery to be reduced below a threshold state of charge. The method 300 may comprise a battery state of charge determination block 310, at which the state of charge of the battery is determined, e.g. based on a voltage across the battery. The heater 192 and air moving device 174 may be operated based on the state of charge of the battery. For example, if the state of charge of the battery is at or below the threshold state of charge, the heater 192 and air moving device 174 may not be operated.

In some arrangements, the state of the charge of the battery may be determined, e.g. monitored, whilst the heater 192 and air moving device 174 are operating. If the state of charge of the battery drops to or below the threshold charge whilst the heater and/or air moving device are being operated according to the method 300, the heater 192 and air moving device may be deactivated.

Figure 4:
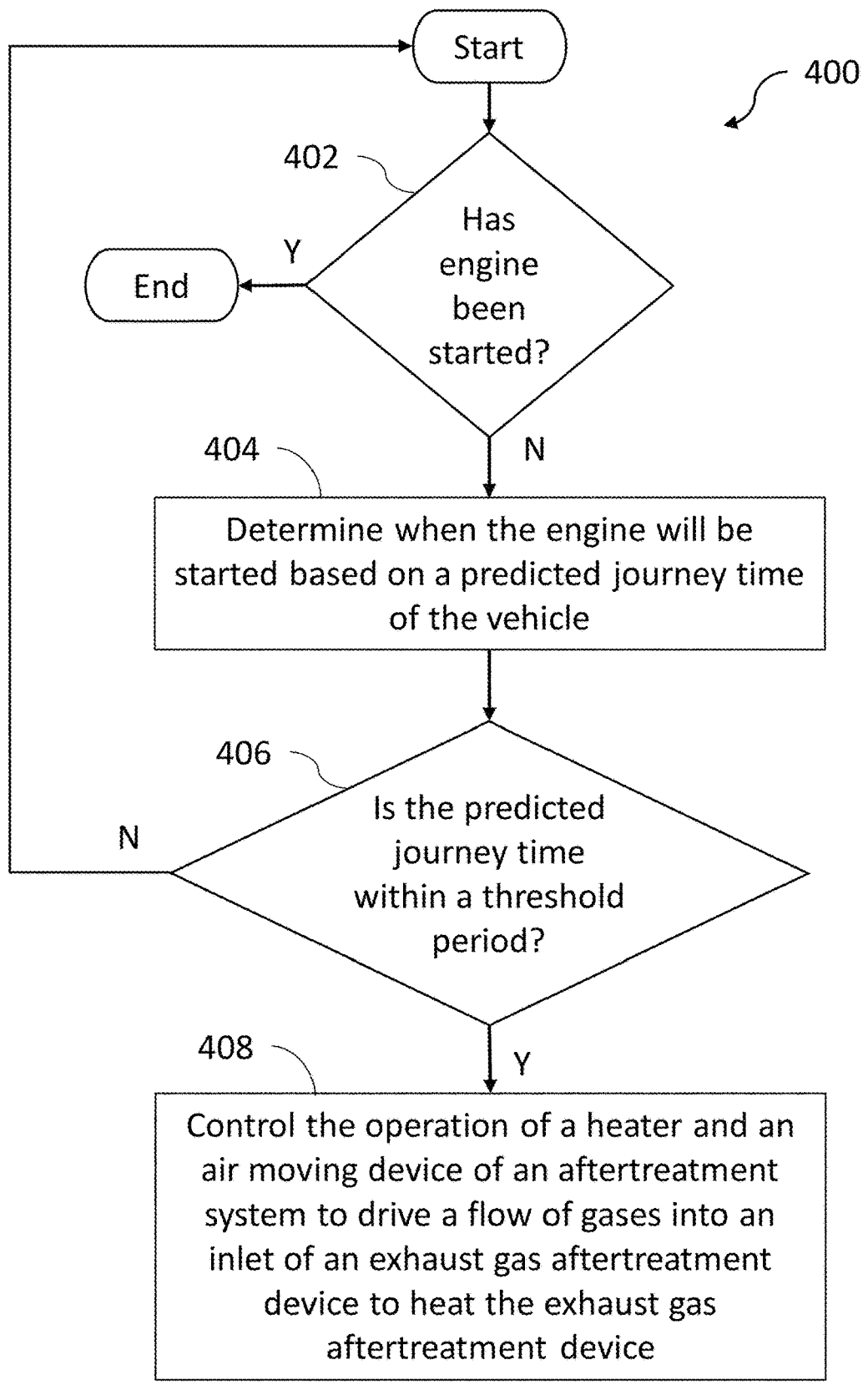
FIG. 4 is a flow chart illustrating another method for an engine assembly according to arrangements of the present disclosure.

FIG. 4 illustrates another method 400 of operating an engine assembly according to the present disclosure.

At block 402, a controller, e.g. an electronic control unit (ECU) of a vehicle, determines if an engine of an engine assembly of the vehicle has ben started. Where it is determined that the engine has been started, method 400 terminates. Where it is determined that the engine has not been started, method 400 moves on to block 404. In some examples, determining that the engine has not been started may comprise determining whether a request to start the engine has been received, but the actual starting of the engine has not yet occurred.

At block 404, the controller determines when the engine will be started based on a predicted journey time of the vehicle. For example, method 400 may comprise a step of receiving journey data from one or more sources. In some examples, a vehicle controller may be configured to be operationally connected to one or more databases, e.g. by virtue of a network, such as the internet. The one or more databases may comprise calendar information of a user of the vehicle. In some example, a vehicle controller may be configured to connect to a mobile communication device of the user and/or access a user profile to determine a journey start time. For example, a user may have a calendar entry in an electronic diary indicating a journey start time. In some examples, the journey start time may be a predicted journey start time, e.g. based on vehicle usage history. For example, where a user completes a journey, e.g. a route, on a regular basis, a controller, e.g. a vehicle controller and/or a controller of a user, may predict a future occurrence of a similar journey, e.g., based on the vehicle usage history. In some examples, the predicted journey time may relate to a delayed start of the engine. For example, the predicted journey time may be a time between receiving a request to start the engine of the vehicle and starting the engine of the vehicle.

At block 406, the controller determines if the predicted journey time is within a threshold period. For example, the controller may determine that the predicted journey start time is within 5 minutes, or any other appropriate period, of a current time. Where the period between the current time and the predicted journey start time is greater than a threshold period, method 400 returns to the start. Where the period between the current time and the predicted journey start time is within the threshold period, method 400 moves to block 408.

At block 408, the controller causes operation of a heater and an air moving device of an aftertreatment system to drive a flow of gases into an inlet of an exhaust gas aftertreatment device to heat the exhaust gas aftertreatment device, e.g. in a similar manner to that described in the above examples.

The actions or descriptions of FIG. 4 may be used with any other example of this disclosure, e.g. in one or more of the example described above in relation to FIGS. 2 and 3. In addition, the actions and descriptions described in relation to any of FIGS. 2 to 4 may be done in any suitable alternative order(s) or in parallel to further the purposes of this disclosure.

Figure 5:
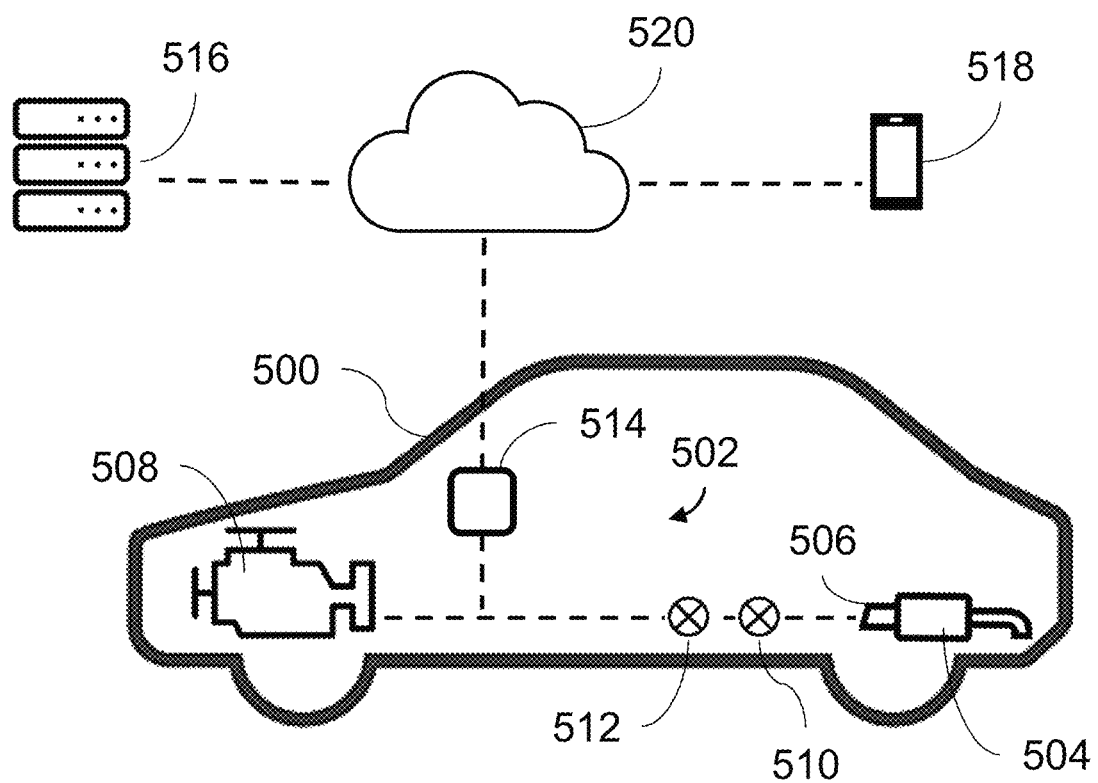
FIG. 5 is a vehicle having an engine assembly according to arrangements of the present disclosure.

FIG. 5 illustrates a vehicle 500 having an engine assembly 502 according to arrangements of the present disclosure. The engine assembly 502 comprises an exhaust gas aftertreatment device 504 device having an inlet 506 for receiving exhaust gases leaving an engine 508. The engine assembly 502 comprises a heater 510 for selectively heating gases at and/or upstream of the exhaust gas aftertreatment device 504, and an air moving device 512 for driving a flow of gases into the inlet 506 of the exhaust gas aftertreatment device 504 when the engine 508 is in a non-running condition. The engine assembly 502 is coupled to a controller 514 configured to, prior to the engine being started i) operate the heater 510 to heat gases at and/or upstream of the inlet 506, and ii) operate the air moving device 512 to drive a flow of gases into the inlet 506 to heat the exhaust gas aftertreatment device 504.

In some example, controller 514 is operationally connected to one or more other devices, such as a database 516 and/or a user device 518 via a network 520, e.g., such that controller 514 can request and/or receive data, e.g. data relating to a future journey of the vehicle, such that controller 514 can cause the operation of heater 510 and air moving device 512 to drive a flow of gases into the inlet 506 to heat the exhaust gas aftertreatment device 504.

This disclosure is made for the purpose of illustrating the general principles of the systems and processes discussed above and are intended to be illustrative rather than limiting. More generally, the above description is meant to be exemplary and not limiting and the scope of the disclosure is best determined by reference to the appended claims. In other words, only the claims that follow are meant to set bounds as to what the present disclosure includes.

While the present disclosure is described with reference to particular example applications, it will be appreciated that the disclosure is not limited hereto and that particular combinations of the various features described and defined in any aspects can be implemented and/or supplied and/or used independently. It will be apparent to those skilled in the art that various modifications and improvements may be made without departing from the scope and spirit of the present disclosure. Those skilled in the art would appreciate that the actions of the processes discussed herein may be omitted, modified, combined, and/or rearranged, and any additional actions may be performed without departing from the scope of the disclosure.

Any system features as described herein may also be provided as a method feature and vice versa. As used herein, means plus function features may be expressed alternatively in terms of their corresponding structure. It shall be further appreciated that the systems and/or methods described above may be applied to, or used in accordance with, other systems and/or methods.

Any feature in one aspect may be applied to other aspects, in any appropriate combination. In particular, method aspects may be applied to system aspects, and vice versa. Furthermore, any, some and/or all features in one aspect can be applied to any, some and/or all features in any other aspect, in any appropriate combination.

The following additional, numbered statements of invention are also included within the specification and form part of the present disclosure:

Statement 1. An engine assembly, the engine assembly comprising:
   an exhaust gas aftertreatment device having an inlet for receiving exhaust gases leaving an engine;
   a heater for selectively heating gases at or upstream of the exhaust gas aftertreatment device;
   an air moving device for driving a flow of gases into the inlet of the exhaust gas aftertreatment device when the engine is in a non-running condition; and
   a controller configured to, prior to the engine being started:
      operate the heater to heat gases at or upstream of the inlet; and
      operate the air moving device to drive a flow of gases into the inlet to thereby heat the exhaust gas treatment device.

Statement 2. The engine assembly of statement 1, wherein the engine assembly further comprises an exhaust gas duct for carrying exhaust gases from the engine to the inlet of the exhaust gas treatment device, wherein the heater is provided in the exhaust gas duct.

Statement 3. The engine assembly of statement 1 or 2, wherein the engine assembly comprises a further exhaust gas aftertreatment device arranged downstream of the exhaust gas treatment device, wherein the engine assembly is configured such that the air moving device drives the flow of gases through the exhaust gas aftertreatment device to reach the further exhaust gas treatment device.

Statement 4. The engine assembly of any of the preceding statements, wherein the heater is integrally formed with the exhaust gas treatment device.

Statement 5. The engine assembly of any of the preceding statements, wherein the air moving device comprises an electrically driven inlet compressor.

Statement 6. The engine assembly of any of the preceding statements, wherein the air moving device is arranged between an air inlet for the engine and the engine.

Statement 7. The engine assembly of any of the preceding statements, wherein the engine assembly is configured such that the air moving device drives the flow of gases from an air inlet for the engine to the inlet of the exhaust gas treatment device.

Statement 8. The engine assembly of any of the preceding statements, wherein the engine assembly further comprises an engine bypass duct for carrying inlet gases from the air moving device to the inlet of the exhaust treatment device bypassing the engine.

Statement 9. The engine assembly of statement 8, wherein the engine assembly further comprises a valve for controlling the flow of inlet gases through the engine bypass duct.

Statement 10. The engine assembly of any of the preceding statements, wherein the controller is configured to control one or more valves in order to permit a flow of air from the air inlet for the engine to the inlet of the exhaust treatment device when the engine is not running.

Statement 11. The engine assembly of statement 10, wherein the controller is configured to control an inlet valve and/or an exhaust valve of a cylinder of the engine in order to provide an air flow path through the engine between the air moving device and the inlet of the exhaust gas treatment device.

Statement 12. The engine assembly of any of the preceding statements, wherein the controller is configured to:
   determine when the engine of the engine assembly may be started; and
   control the operation of the heater and the operation of the air moving device based on the determination.

Statement 13. The engine assembly of statement 12, wherein the controller is configured to determine when the engine may be started based on a door of a vehicle in which the engine assembly is provided being unlocked and/or opened.

Statement 14. The engine assembly of statement 12 or 13, wherein the controller is configured to determine when the engine may be started based on a proximity of a key for the vehicle to the vehicle.

Statement 15. The engine assembly of any of statements 12 to 14, wherein the controller is configured to determine when the engine may be started based on a predicted journey time of the vehicle.

Statement 16. The engine assembly of any of the preceding statements, wherein the controller is configured to control the operation of the heater and air mover in order to maintain the temperature of the exhaust gas aftertreatment device between a predetermined upper temperature limit and a predetermined lower temperature limit.

Statement 17. A method for an engine assembly, the engine assembly comprising:
   an exhaust gas aftertreatment device having an inlet for receiving exhaust gases leaving an engine;
   a heater for selectively heating gases at or upstream of the exhaust gas treatment device; and
   an air moving device for driving a flow of gases into the inlet of the exhaust gas treatment device; wherein the method comprises, prior to the engine being started:
   operating the heater to heat gases at the inlet; and
   operating the air moving device to drive a flow of gases into the inlet to thereby heat the exhaust gas treatment device.

Statement 18. The method of statement 17, wherein the method further comprises controlling one or more valves of the engine assembly to permit a flow of air from an inlet of the engine assembly to the inlet of the exhaust gas treatment device.

Statement 19. The method of statement 17 or 18 further comprising:
   determining when the engine of the engine assembly may be started; and
   controlling the operation of the heater and the operation of the air moving device based on the determination.

Statement 20. The method of any of statements 17 to 19, wherein the method comprises:
   determining a state of charge of a battery of the vehicle, wherein the operation of the heater and the operation of the air moving device are controlled based on the determined state of charge.

Statement 21. The method of any of statements 17 to 20, wherein the method comprises:
   controlling the operation of the heater and air mover in order to maintain the temperature of the exhaust gas aftertreatment device between a predetermined upper temperature limit and a predetermined lower temperature limit.

It will be appreciated by those skilled in the art that although the invention has been described by way of example, with reference to one or more exemplary examples, it is not limited to the disclosed examples and that alternative examples could be constructed without departing from the scope of the invention as defined by the appended claims.

The invention claimed is:

1. An engine assembly, the engine assembly comprising:
   an exhaust gas aftertreatment device having an inlet for receiving exhaust gases leaving an engine;
   a heater for selectively heating gases at and/or upstream of the exhaust gas aftertreatment device;
   an air moving device for driving a flow of gases into the inlet of the exhaust gas aftertreatment device when the engine is in a non-running condition;
   a controller configured to, prior to the engine being started:
      operate the heater to heat gases at and/or upstream of the inlet;
      operate the air moving device to drive a flow of gases into the inlet to heat the exhaust gas aftertreatment device; and
      control an inlet valve and/or an exhaust valve of a cylinder of the engine in order to provide an air flow path through the engine between the air moving device and the inlet of the exhaust gas aftertreatment device; and
   an engine bypass duct for carrying inlet gases from the air moving device to the inlet of the exhaust gas aftertreatment device bypassing the engine.

2. The engine assembly of claim 1, wherein the engine assembly further comprises an exhaust gas duct for carrying exhaust gases from the engine to the inlet of the exhaust gas treatment device, wherein the heater is provided in the exhaust gas duct.

3. The engine assembly of claim 1, wherein the engine assembly comprises a further exhaust gas aftertreatment device arranged downstream of the exhaust gas aftertreatment device, wherein the engine assembly is configured such that the air moving device drives the flow of gases through the exhaust gas aftertreatment device to reach the further exhaust gas aftertreatment device.

4. The engine assembly of claim 1, wherein the air moving device comprises an electrically driven inlet compressor.

5. The engine assembly of claim 1 wherein the engine assembly further comprises a valve for controlling the flow of inlet gases through the engine bypass duct.

6. The engine assembly of claim 1, wherein the controller is configured to:
   determine when the engine of the engine assembly may be started; and
   control the operation of the heater and the operation of the air moving device based on the determination.

7. The engine assembly of claim 6, wherein the controller is configured to determine when the engine may be started based on:
   a door of a vehicle in which the engine assembly is provided being unlocked and/or opened;
   a proximity of a key for the vehicle to the vehicle; and/or
   a predicted journey time of the vehicle.

8. The engine assembly of claim 1, wherein the controller is configured to control the operation of the heater and air moving device in order to maintain the temperature of the exhaust gas aftertreatment device between a predetermined upper temperature limit and a predetermined lower temperature limit.

9. A vehicle having the engine assembly of claim 1.

10. A method for an engine assembly, the engine assembly comprising:
    an exhaust gas aftertreatment device having an inlet for receiving exhaust gases leaving an engine;
    a heater for selectively heating gases at and/or upstream of the exhaust gas treatment device;
    an air moving device for driving a flow of gases into the inlet of the exhaust gas aftertreatment device;
    an engine bypass duct for carrying inlet gases from the air moving device to the inlet of the exhaust gas aftertreatment device bypassing the engine, wherein the method comprises, prior to the engine being started:
       operating the heater to heat gases at and/or upstream of the inlet;
       operating the air moving device to drive a flow of gases into the inlet to heat the exhaust gas aftertreatment device;
       operating the engine bypass duct to carry inlet gases from the air moving device to the inlet of the exhaust gas aftertreatment device bypassing the engine; and
       controlling an inlet valve and/or an exhaust valve of a cylinder of the engine to permit a flow of air from an inlet of the engine assembly to the inlet of the exhaust gas aftertreatment device.

11. The method of claim 10 further comprising:
    determining when the engine of the engine assembly may be started; and
    controlling the operation of the heater and the operation of the air moving device based on the determination.

12. The method of claim 10, wherein the method comprises:
    determining a state of charge of a battery of the engine assembly, wherein the operation of the heater and the operation of the air moving device are controlled based on the determined state of charge.

13. The method of claim 10, wherein the method comprises:
    controlling the operation of the heater and air moving device in order to maintain the temperature of the exhaust gas aftertreatment device between a predetermined upper temperature limit and a predetermined lower temperature limit.

14. The method of claim 10, wherein the method comprises:
    determining when the engine will be started based on a predicted journey time of a vehicle, which the engine assembly is installed; and
    controlling the operation of the heater and air moving device to heat the exhaust gas aftertreatment device based on the predicted journey time.

15. The method of claim 14, wherein determining when the engine will be started comprises receiving future journey data.

16. A method for an engine assembly, the engine assembly comprising:
    an exhaust gas after treatment device having an inlet for receiving exhaust gases leaving an engine;
    a heater for selectively heating gases at and/or upstream of the exhaust gas aftertreatment device;
    an air moving device for driving a flow of gases into the inlet of the exhaust gas aftertreatment device, wherein the method comprises, prior to the engine being started:

determining when the engine of the engine assembly will be started based on a predicted journey time of the vehicle;

controlling the operation of the heater and the operation of the air moving device based on the determination to carry inlet gases from the air moving device to the inlet of the exhaust gas aftertreatment device bypassing the engine assembly, drive a flow of gases into the inlet and heat the exhaust gas aftertreatment device; and controlling an inlet valve and/or an exhaust valve of a cylinder of the engine to permit a flow of air from an inlet of the engine assembly to the inlet of the exhaust gas aftertreatment device.

* * * * *